United States Patent [19]

Garrett

[11] Patent Number: 5,329,219

[45] Date of Patent: Jul. 12, 1994

[54] METHOD AND APPARATUS FOR CHARGING A BATTERY

[75] Inventor: Scott M. Garrett, Boca Raton, Fla.

[73] Assignee: Motorola, Inc., Schaumburg, Ill.

[21] Appl. No.: 53,288

[22] Filed: Apr. 28, 1993

[51] Int. Cl.$^5$ .............................................. H02J 7/10
[52] U.S. Cl. ..................................... 320/22; 320/20; 320/35
[58] Field of Search ........................... 320/20, 35, 22

[56] References Cited

U.S. PATENT DOCUMENTS

| | | | |
|---|---|---|---|
| 3,531,707 | 9/1970 | Finnegan | 320/43 |
| 3,534,241 | 10/1970 | Wilson et al. | 320/33 |
| 3,602,794 | 8/1971 | Westhaver | 320/39 |
| 3,667,026 | 5/1972 | Bogut et al. | 320/36 |
| 3,767,995 | 10/1973 | Kaminski et al. | 320/22 |
| 3,852,652 | 12/1974 | Jasinski | 320/35 |
| 3,854,082 | 12/1974 | Nasby et al. | 320/22 |
| 4,061,956 | 12/1977 | Brown et al. | 320/22 |
| 4,237,411 | 12/1980 | Kothe et al. | 320/22 X |
| 4,468,605 | 8/1984 | Fitzgerald et al. | 320/36 |
| 4,727,306 | 2/1988 | Misak et al. | 320/35 |
| 4,755,735 | 7/1988 | Inakagata | 320/35 |
| 4,888,544 | 12/1989 | Terry et al. | 320/37 |
| 5,028,859 | 7/1991 | Johnson et al. | 320/15 |
| 5,057,762 | 10/1991 | Goedken et al. | 320/15 |
| 5,121,047 | 6/1992 | Goedken et al. | 320/39 |
| 5,122,722 | 6/1992 | Goedken et al. | 320/22 |

Primary Examiner—R. J. Hickey
Attorney, Agent, or Firm—Pedro P. Hernandez

[57] ABSTRACT

A charger includes a control circuit (308) for determining the charge rate and charge capacity of a battery (312). Control circuit (308) switches the rate at which battery (312) is being charged from a first charge rate such as a rapid charge rate (206) to a charge rate which is increasing in charge over time (208). Once battery (312) becomes fully charged, control circuit (308) then charges battery (312) at a third charge rate such as a trickle rate (214).

12 Claims, 2 Drawing Sheets

METHOD AND APPARATUS FOR CHARGING A BATTERY

TECHNICAL FIELD

This invention relates in general to the field of battery charging, and more specifically to a method and apparatus for charging a rechargeable battery.

BACKGROUND

Conventional battery chargers used to charge rechargeable batteries such as Nickel-Cadmium (NiCd) or Nickel Metal Hydride (NiMH) batteries in a rapid fashion typically drop the rate at which the battery is being charged once the battery begins to increase in temperature. For example, a typical rapid charger used to charge two-way radio batteries begins to charge the battery at a charge rate approximating the capacity of the battery in one hour (charge rate of "C"/hr where "C" is the capacity of the battery), the battery charger then drops the charge current to a trickle rate (e.g., C/20 or less) once the battery starts to increase in temperature by a certain amount over time (reaches a certain $\Delta T/\Delta t$). Usually the battery is between 88% and 93% charged at the time the charger switches to the trickle charge. At the trickle charge rate, the battery becomes fully charged after 10 or more hours in the battery charger.

The main reason for dropping the charge rate from a rapid rate to a trickle charge rate is to avoid excessive heating of the battery cells, since the charge efficiency of the battery cells decreases as the battery temperature increases. However, although reducing the charge rate protects the battery from thermal damage, the trickle charge rate requires 10 hours or more to fully charge the battery. A need thus exists for a method and apparatus which can fully charge a rechargeable battery faster but yet protect the battery cells from excessive heating.

DETAILED DESCRIPTION OF THE PREFERRED EMBODIMENT

Figure 1:
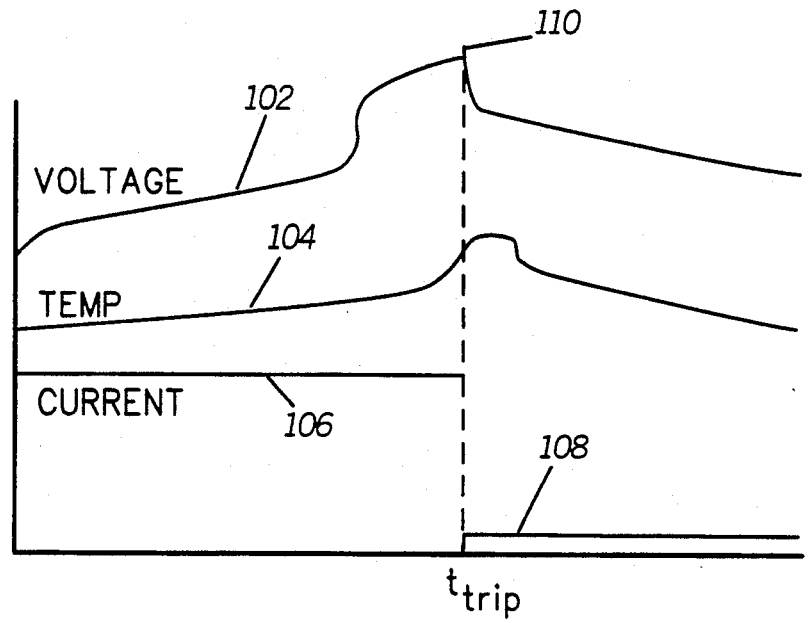
FIG. 1 is a graph showing the battery voltage, battery temperature and the battery charging current from a prior art battery charger.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a graph showing a voltage curve 102, a temperature curve 104, and a charge current curve 106, of a battery being charged by a prior art charger is shown. As the battery becomes charged over time, the battery voltage begins to rise as shown by voltage curve 102. However, the battery temperature also begins to rise gradually as shown by temperature curve 104. At a point in time designated in the graph as trip point ($t_{trip}$) 110, the battery temperature begins to rise at a faster rate given that the charge efficiency of the battery cells begins to decrease dramatically once they reach a certain temperature and change state. The rate at which the battery temperature is rising can be determined by the charger sensing a thermistor which is located inside of the battery as known in the art. As the battery's temperature begins to rise, the thermistors change in resistance is monitored by the charger allowing the charger to determine the rate of temperature change for the battery under charge.

At time 110, the conventional battery charger places the battery in a trickle charge rate, as shown by curve 108 in order to protect the battery cells from damage caused by overheating. The trickle charge rate can be a rate such as C/20 were "C" is the capacity of the battery (e.g., C=1000 milliamp). At this trickle rate, the battery under charge reaches complete charge in approximately 10-14 hours. Once fully charged, the battery is maintained at the fully charged state by the trickle charge until the battery is used.

Figure 2:
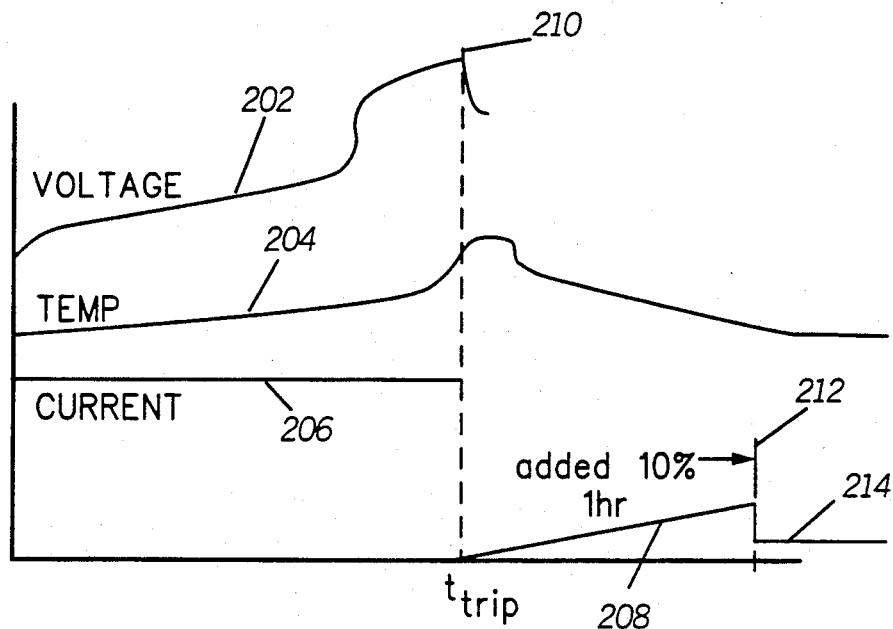
FIG. 2 is a graph showing the battery voltage, battery temperature and the battery charging current of the present invention.

In FIG. 2, a graph showing a voltage curve 202, a temperature curve 204, and a charge current curve 206, of a battery being charged by a charger in accordance with the present invention is shown. In FIG. 2, once the charging reaches trip point 210, the charger begins to charge the battery using a reverse taper (increasing current rate) charge rate as shown in curve 208. Trip point 210 is preferably determined by the battery charger determining the temperature slope (change in temperature over a given time, $\Delta T/\Delta t$) of the battery and comparing it to a value the charger has stored. The determination of the temperature rate increase at the battery is accomplished, as mentioned before, by preferably having the charger monitor the temperature using a thermistor. Once the battery reaches trip point 210, the charger switches to the reverse taper charge rate sequence 208. Other methods of determining trip point 210 can include monitoring the change in battery voltage, keeping track of the time the battery has been charged, etc.

Once the charger determines that trip point ($t_{trip}$) 210 has been reached, the increasing current charge sequence 208 is begun. In the preferred embodiment, the inverse taper charge sequence 208 starts at zero current and reaches a predetermined maximum charge rate (e.g., C/3, etc.) at time 212. It will typically take approximately 1 hour to reach point 212 at which time the battery is fully charged, saving approximately 9 to 13 hours over the prior art charger shown in FIG. 1. Instead of beginning charge sequence 208 immediately after trip point 210 is reached, the present invention can also be designed to wait a predetermined amount of time prior to commencing the increasing charge rate sequence 208. If one waits a predetermined period of time or waits until the temperature slope of the battery has reached a predetermined level as determined by the charger prior to commencing inverse taper charge sequence 208, the charge slope of charge sequence 208 can be modified accordingly in order to fully charge the battery as quickly as possible without thermally damaging the battery.

The slope of the inverse taper is controlled by the charger's controller which monitors the temperature of the battery in order to make certain the battery does not overheat. Since the temperature of the battery as shown in FIG. 2 begins to decrease gradually (downward slopping) once the rapid charge rate 206 is terminated at time 210, the gradually increasing charge sequence 208 of the present invention does not cause any overheating to occur at the battery, while the increasing current charge rate speeds up the time the battery needs to reach full charge. Preferably, during the increasing charge sequence 208, controller circuit 308 keeps monitoring the change in battery temperature in order to adjust the rate of current increase during sequence 208 in order to assure that the battery under charge does not overheat. Once the battery reaches its fully charged state, the charger enters a trickle charge rate (e.g., C/20 charge rate, etc.) as shown by line 214 in order to maintain the battery fully charged until its use.

Figure 3:
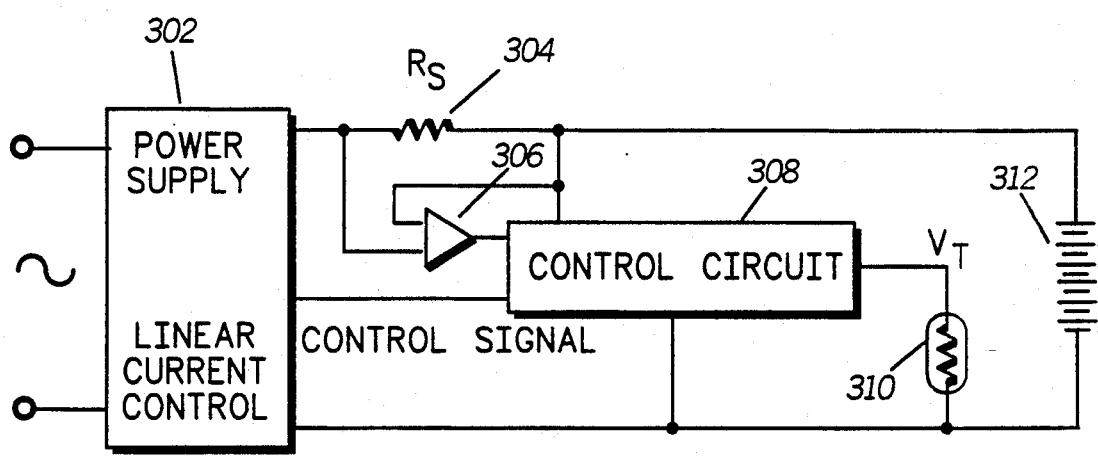
FIG. 3 is a block diagram of a battery charger in accordance with the present invention.

Referring to FIG. 3, a charger in accordance with the present invention is shown. The charger includes a power supply/current control section 302 for converting the alternating current on inputs 314 and 316 into direct current at outputs 318 and 320 as known in the art. Section 302 also provides a programmable current regulator section as known in the art which provides a charge current to battery 312 which is dependent on a control signal sent by control circuit 308. The amount of charge current supplied to battery 312 by circuit 302 is controlled by control circuit 308 via the Control Signal line coupled between section 302 and control circuit 308.

A sense resistor 304 is connected in series between power supply 302 and battery 312. A comparator circuit 316 senses the voltage drop across resistor 304 and provides a current sense signal to controller 308. Controller 308 can be a microprocessor such as a MC68HC11 manufactured by Motorola, Inc. or other known microprocessors. Controller 308 preferably includes built-in memory and input/output (I/O) capabilities. The current sense signal informs the controller of how much current is being sent from the power supply/linear current control circuit 302 to battery 312 in order to make sure that current control section 302 is sending the proper amount of current to battery 312.

Battery 312 has a thermistor 310 located in thermal proximity or inside of the battery housing. Thermistor 310 is coupled to the charger contacts when battery 312 is placed in the charger. Thermistor 310 provides a temperature signal to control circuit 308 which allows for controller 308 to monitor the temperature of battery 312 while it is being charged. Depending on the change in temperature of battery 312, controller 308 sends a control signal to current control circuit 302 in order to adjust the amount of current being sent to battery 312. Since at a particular charge level as has been shown in FIG. 2, the delta change in temperature of a particular type of battery such as a Nickel-Cadmium (NiCd) has a particular slope, the thermistor acts as a means for determining the charge level of the battery under charge. Thermal damage to battery 312 is avoided by maintaining the maximum charge rate during charge sequence 208 substantially below rapid charge rate 206. For example, if rapid rate 206 is the capacity of the battery per hour, the maximum charge rate experienced during charge sequence 208 might be C/3 per hour.

By monitoring the resistance level of the thermistor at different points in time, controller 308 can calculate the temperature slope battery 312 is experiencing and compare this slope to values stored in the control circuit's internal memory. Once the temperature slope of the battery reaches the predetermined value which represents a particular battery charge level, controller 308 knows that it must enter the increasing charge rate sequence 208 of the present invention. The thermistor 310 inside of the battery and the control circuit 308 act as a means for providing the increasing charge current to the battery once the battery has reached trip point 210. During the increasing charge sequence 208, control circuit 308 varies the control signal sent to current control circuit 302 in order to generate the upward ramping charge current.

Control circuit 308 also provides for a timing means which is preferably a timing algorithm stored in the control circuit's memory and which is performed by the control circuit 308 in order to determine when to terminate the inverse taper charge sequence 208 (e.g., after one hour, etc.). The amount of time in the inverse taper sequence 208 will depend on several factors such as the size of the battery to be charged, the rate at which the temperature of the battery is decreasing as measured by control circuit 308, and the slope of the inverse taper charge sequence 208.

Since controller 308 is monitoring the signal provided by thermistor 310, it can determine the delta change in temperature of battery 312 and determine when trip point 210 ($t_{trip}$) occurs in order to switch from the first rapid charge rate 206 to the inverse taper rate 208 of the present invention. Although not shown in FIG. 3, battery 312 can also include a coding resistor as known in the art which can be "read" by control circuit 308 when battery 312 is placed in the charger in order to determine the size (charge capacity) of battery 312. By knowing the size of battery 312, the charger can then know at what charge rate 206 to begin to charge battery 312 (e.g., at a charge rate that equals the capacity of the battery, "C").

Figure 4:
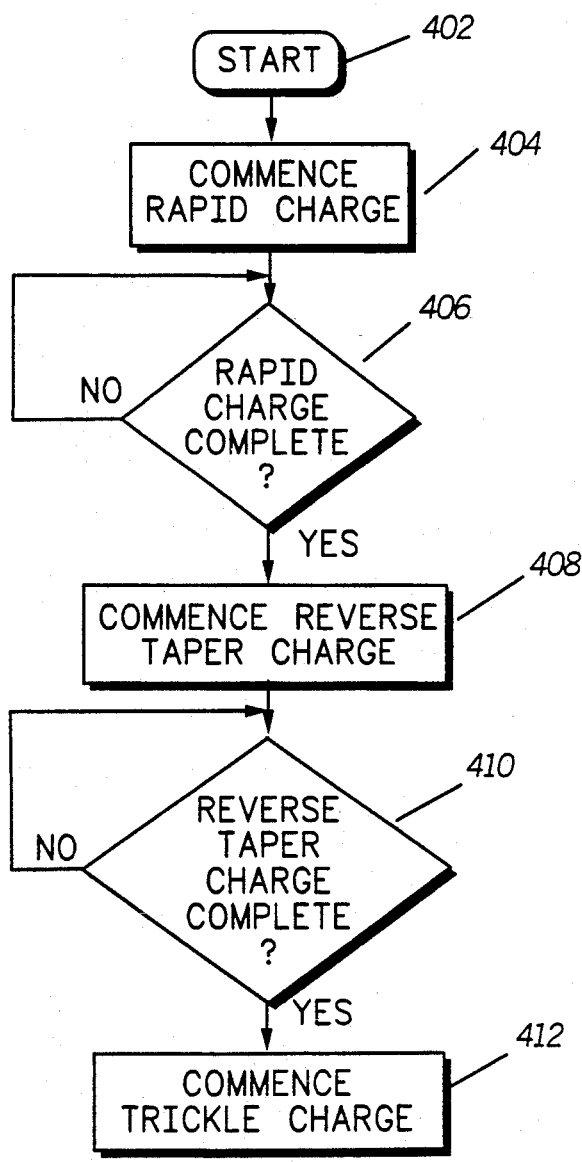
FIG. 4 is a flow chart showing the steps in charging a battery in accordance with the present invention.

In FIG. 4, the steps involved in charging a battery in accordance with the present invention are shown. In step 402, the battery charger determines if a battery has been placed in the charger. This can be accomplished by several known methods, such as by sensing a code resistor found in the battery as previously discussed. The sense resistor can inform charger control circuit 308 not only that a battery is present, as previously mentioned, but also the size (i.e. battery charge capacity ) of the battery, so that the charger can provide the proper initial charge rate to the battery. In step 404, the charger commences to charge the battery at a rapid charge rate or first charge rate. For example, if the battery has a capacity ("C") of 1000 milliamp-hour (maH), the charger would charge the battery at a rate equaling 1000 ma/hour, which is a charger rate of "C".

In step 406, the charger determines if the rapid charge rate is complete. In the preferred embodiment, this is determined by the battery charger monitoring the delta temperature over time ($\Delta T/\Delta t$) of the battery since the temperature of the battery has a characteristic rise as it approaches a particular charge level. Other methods of determining when the rapid charge sequence is complete is by timing the rapid charge step, and at a particular time terminating the rapid charging or by measuring the battery voltage. However, these methods are not as accurate as the delta temperature method previously described.

Once the battery reaches rapid charge termination point 210, in step 410, the charger commences to charge the battery using a charge sequence which is increasing in charge rate over a predetermined period of time. This increasing charge sequence is shown in FIG. 2 as charge sequence 218. During this charge sequence, the charger is supplying a charge current to battery 312 which is increasing over time. The amount of time spent in the increasing charge current sequence (reverse taper charge rate) depends on the size of the battery to be charged, the slope at which the current is being increased, and the temperature change of the battery that is being charged. As mentioned before, the charger may wait a predetermined amount of time or wait until the change in temperature of battery 312 reaches a predetermined level before the charger commences the inverse taper charge sequence.

The inverse taper charge sequence is begun by controller 308 sending a control signal to circuit 302 informing it to change its charge rate from the initial fast charge rate. Control circuit 308 during the reverse taper sequence will be continuously updating the control signal sent to circuit 302 in order to generate the upward slopping ramp of charge sequence 208. If in step 412 the charger determines that the reverse taper charge sequence is complete, such as by the expiration of a timer sequence in control circuit 308, controller 308 adjusts the control signal sent to circuit 302 in order to place the charger in a trickle charge rate. The trickle charge rate will then maintain the battery fully charged until its eventual use.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a battery with a battery charger, comprising the steps of:
   (a) charging the battery using a first charge rate;
   (b) determining if the battery has reached a predetermined charge level;
   (c) charging the battery using an inverse taper charge rate which is increasing at a predetermined slope after the battery has reached the predetermined charge level; and
   (d) charging the battery at a fixed charge rate which is lower than the first charge rate after performing step (c).

2. A method for charging a battery as defined in claim 1, wherein step (c) comprises the steps of:
   (c1) lowering the first charge rate to a predetermined level; and
   (c2) charging the battery using a charge rate which is increasing at a predetermined slope for a predetermined period of time.

3. A method for charging a battery as defined in claim 1, wherein the maximum charge rate reached during the increasing charge rate of step (c) is lower than the first charge rate.

4. A method for charging a battery as defined in claim 1, wherein the predetermined charge level of the battery in step (b) is determined by determining the rate of change in temperature of the battery and comparing this to a threshold level stored in the charger.

5. A method for charging a battery, comprising the steps of:
   (a) supplying a first charging current to the battery;
   (b) determining if the battery has reached a predetermined charge level;
   (c) lowering the first charging current to a predetermined level if it is determined in step (b) that the battery has reached the predetermined charge level;
   (d) supplying an inverse taper charging current which is increasing at a predetermined slope for a predetermined period of time to the battery, the inverse taper charging current reaching a maximum charge current which is lower than the first charging current; and
   (e) supplying a charging current to the battery which is lower than the first charging current once the battery has been charged by the inverse taper charging current of step (d) for a predetermined period of time.

6. A method for charging a battery as defined in claim 5, wherein the predetermined charge level of the battery is determined by determining the rate of change in temperature of the battery and comparing this to a threshold level stored in the charger.

7. A method for charging a battery as defined in claim 5, wherein step (d) occurs a predetermined period of time after the battery has reached the predetermined charge level.

8. A charger for charging a battery, comprising:
   a controller providing a variable control signal;
   a current control means responsive to the variable control signal for providing a charge current to the battery corresponding to the variable control signal;
   means coupled to the controller for determining the charge level of the battery;
   means for causing the current control means to provide an inverse taper charge current which is increasing at a predetermined slope for a predetermined period of time to the battery once the battery has reached a predetermined charge level; and
   means for charging the battery at a fixed charge rate after the battery has been charged with the inverse taper charge current, for the predetermined period of time.

9. A charger as defined in claim 8, wherein the means for determining the charge level of the battery comprises a thermistor in thermal proximity to the battery which provides a temperature signal to the controller.

10. A charger as defined in claim 9, wherein the controller monitors the temperature signal provided by the thermistor and adjusts the variable control signal sent to the current control means in response to changes in the temperature signal.

11. A charger as defined in claim 9, wherein the means for causing the current control means to provide the inverse taper charge current comprises a timer means coupled to the controller for determining the amount of time the battery has been charged with the inverse taper charge current.

12. A method for charging a battery as defined in claim 1, further comprising the steps of:
   (d) determining the temperature of the battery;
   (e) adjusting the slope of the inverse taper charge rate if the temperature of the battery reaches a predetermined level.

* * * * *